US005548770A

United States Patent [19]

Bridges

[11] Patent Number: 5,548,770
[45] Date of Patent: Aug. 20, 1996

[54] METHOD AND APPARATUS FOR IMPROVING RETRIEVAL OF DATA FROM A DATABASE

[75] Inventor: Timothy R. Bridges, Bloomington, Ind.

[73] Assignee: Data Parallel Systems, Inc., Bloomington, Ind.

[21] Appl. No.: 22,183

[22] Filed: Feb. 25, 1993

[51] Int. Cl.⁶ ............................................. G06F 15/40
[52] U.S. Cl. ........................ 395/800; 395/600; 395/650; 364/231.9; 364/283 A; 364/DIG. 1
[58] Field of Search ............................. 395/800, 600, 395/650; 364/DIG. 1

[56] References Cited

U.S. PATENT DOCUMENTS

| | | | |
|---|---|---|---|
| 4,497,039 | 1/1985 | Kitakami et al. | 364/DIG. 2 |
| 4,870,568 | 9/1989 | Kahle et al. | 364/DIG. 1 |
| 5,239,663 | 8/1993 | Faudemay et al. | 395/800 |
| 5,325,525 | 6/1994 | Shan et al. | 395/650 |
| 5,367,677 | 11/1994 | Stanfill | 395/600 |

OTHER PUBLICATIONS

M. Missikoff, "A Domain Based Internal Schema for Relational Database Machines", ACM, 1982, pp. 215–224.
M. Missikoff et al., "Relational Queries In A Domain Based DBMS", ACM, 1983, pp. 219–227.
T. Bridges et al., "An Efficient Implementation for Nested Relational Databases on the Massively Parallel Data Structure Machine", May 1, 1988, pp. 1–23.
Bridges et al., "An Efficient Implementation for Nested Relational Databases on the Massively Parallel Data Structure Machine", May 1988, pp. 1–23.
Wang et al., "Distributed query optimization by one-shot fixed-precision semi-join execution", Seventh International Conference on Data Engineering, Apr. 1991, pp. 756–763.
Bara et al., "Join and Data Redistribution Algorithms for Hypercubes", IEEE, Jan. 1990, pp.: 161–168.

*Primary Examiner*—Mehmet B. Geckil
*Assistant Examiner*—Walter D. Davis, Jr.
*Attorney, Agent, or Firm*—Barnes & Thornburg

[57] ABSTRACT

An indexing system and method are provided for improving retrieval of data based on a query from a user from a database management system including a main computer and a memory coupled to the main computer for storing the data. The indexing system includes a parallel computer coupled to the main computer and a parallel disk array coupled to the parallel computer. The invention includes the steps of storing record based data in the memory of the database management system, storing a value based index of selected attributes related to the record based data on the parallel disk array, and determining whether the parallel computer can be used to execute a query to obtain at least a partial result to the query. If so, the query is sent to the parallel computer and the query is executed on the parallel computer to obtain at least a partial result. If a final result cannot be determined on the parallel computer, the partial result from the parallel computer is sent to the database management system and a final result is determined on the database management system using the partial result received from the parallel computer.

4 Claims, 16 Drawing Sheets

Table 1, the RDAT (Runway Data) table

| RNO | Rlen | Rtype | Rapt |
|---|---|---|---|
| 23L | 10,001 | Concrete | Indianapolis |
| 23R | 10,000 | Concrete | Indianapolis |
| 24 | 3,800 | Asphalt | Bloomington |
| 17 | 5,100 | Asphalt | Bloomington |
| 18 | 2,000 | Grass | Bloomfield |
| 14 | 8,000 | Asphalt | Indianapolis |

Figure 7

Table 2, the ES (Emergency Services) table

| Stype | Sgal | Sloc |
|---|---|---|
| 1 | 10,000 | Indianapolis |
| 2 | 40,000 | Indianapolis |
| 2 | 20,000 | Bloomington |
| 3 | 50,000 | Van Buren |

Figure 8

| TYPE | VAL | REL | TID | VAL | REL | TID | TID | REL | TID | VAL | REL | TID | TID | TID | REL | TID | TID | VAL | REL | TID |
|---|---|---|---|---|---|---|---|---|---|---|---|---|---|---|---|---|---|---|---|---|
| FLAGS | • | • | | • | • | | | • | | • | • | | | | • | | | • | • | |
| | | | | | | • | | | | | • | | | | | | | • | | |
| VALUE | BLOOMFIELD | RDAT/Rapt | 5 | BLOOMINGTON | RDAT/Rapt | 3 | 4 | ES/Sloc | 3 | INDIANAPOLIS | RDAT/Rapt | 1 | 2 | 6 | ES/Sloc | 1 | 2 | VAN BUREN | ES/Sloc | 4 |

VAL Spans

Figure 13

| TYPE | VAL | REL | TID | VAL | REL | TID | TID | REL | TID | VAL | REL | TID | TID | TID | REL | TID | TID | VAL | REL | TID |
|---|---|---|---|---|---|---|---|---|---|---|---|---|---|---|---|---|---|---|---|---|
| FLAGS | • | • | | • | • | | | • | | • | • | | | | • | | | • | • | |
| | | | | • | | | | • | | • | | | | | • | | | • | • | |
| | | | | • | | | | | | • | | | | | | | | | | |
| VALUE | BLOOMFIELD | RDAT/Rapt | 5 | BLOOMINGTON | RDAT/Rapt | 3 | 4 | ES/Sloc | 3 | INDIANAPOLIS | RDAT/Rapt | 1 | 2 | 6 | ES/Sloc | 1 | 2 | VAN BUREN | ES/Sloc | 4 |

VAL Spans

Figure 14

Cross Product Join Table

| RDAT / Rapt | ES / Sloc |
|---|---|
| 3 | 3 |
| 4 | 3 |
| 1 | 1 |
| 1 | 2 |
| 2 | 1 |
| 2 | 2 |
| 6 | 1 |
| 6 | 2 |

Figure 16

| | | | | | | |
|---|---|---|---|---|---|---|
| 24 | 3,800 | Asphalt | Bloomington | 2 | 20,000 | Bloomington |
| 17 | 5,100 | Asphalt | Bloomington | 2 | 20,000 | Bloomington |
| 23L | 10,001 | Concrete | Indianapolis | 1 | 10,000 | Indianapolis |
| 23L | 10,001 | Concrete | Indianapolis | 2 | 40,000 | Indianapolis |
| 23R | 10,000 | Concrete | Indianapolis | 1 | 10,000 | Indianapolis |
| 23R | 10,000 | Concrete | Indianapolis | 2 | 40,000 | Indianapolis |
| 14 | 8,000 | Asphalt | Indianapolis | 1 | 10,000 | Indianapolis |
| 14 | 8,000 | Asphalt | Indianapolis | 2 | 40,000 | Indianapolis |

Figure 17

| 5 | 3 | 4 | 3 | 1 | 2 | 6 | 1 | 2 | 4 |
|---|---|---|---|---|---|---|---|---|---|
| 0 | 1 | 2 | 3 | 4 | 5 | 6 | 7 | 8 | 9 |

METHOD AND APPARATUS FOR IMPROVING RETRIEVAL OF DATA FROM A DATABASE

BACKGROUND AND SUMMARY OF THE INVENTION

The present invention relates to method and apparatus for improving retrieval of data from a database. More particularly, the present invention facilitates retrieval of data from the database by providing an apparatus and method for implementing a value based storage structure which may be used to store an entire database or an index of data which is stored in a conventional database.

Many types of database management systems are known. One such management system is a Relational Database Management System (RDBMS) in which data is serially stored in a computer memory and secondary storage (disk and tape). It is known to provide an index of data stored in a database in a separate index file stored in the computer memory secondary storage (disk and tape). The index is a separate file which stores selected information and provides a map for obtaining that information from the main database. In a conventional RDBMS, the index is serially computed and stored like any other file.

Conceptual data structures have been proposed for storing data in a value based storage arrangement. Value based storage typically includes domain cells, value cells, relation cells, and tuple identification cells which are related to the domain cell. Value based storage systems cannot be implemented efficiently on the serial system of a conventional RDBMS. Value based storage systems require unbounded fanout from each domain cell, each value cell, and each relation cell. The value based data structure implemented on a serial system must use explicit pointers.

The value based data structure cannot be implemented efficiently on conventional computer systems because the data structure has a fixed depth of the tree of four, and thus must allow unbounded fanout from the domain cells, value cells, and relation cells. Unbounded fanout cannot be implemented efficiently on a sequential machine, and must be modeled through the use of B+ trees.

An object of the present invention is to provide an apparatus and method which enables a value based indexing system to be used with a relational database management system to facilitate retrieval of data from a database.

Another object of the present invention is to provide an apparatus and method which permits unbounded fanout of data stored in a database.

According to one aspect of the present invention, an indexing system is provided for improving retrieval of data from a database management system based on a query from a user. The database management system includes a main computer and means coupled to the main computer for storing the data. The indexing system includes a parallel computer coupled to the main computer of the database management system, and means for storing a value based index of selected attributes related to the data stored in the storing means of the database management system. The storing means is coupled to the parallel computer. The indexing system also includes means for determining whether the query can be executed at least partially on the parallel computer, and means for executing the query on the parallel computer to obtain at least a partial result to the query from the parallel computer using the value based index stored in the storing means.

In an illustrated embodiment, the value based index of selected attributes includes value cells and related data cells stored adjacent each value cell. The value based index is stored in the storing means by association with related data items without the use of explicit pointers to permit unbounded fanout of the value based index.

Also in an illustrated embodiment, the indexing system further includes means for mapping a location of a boundary condition for each value cell stored in the value based index storing means. The executing means includes means for distributing data stored in a boundary condition corresponding to a selected value cell of the query across the parallel computer, means for recognizing and marking a span of data cells related to the value cell of the query on the parallel computer, and means for selecting a data cell corresponding to the query from said span of data cells related to the value cell of the query.

In another illustrated embodiment, the related data cells include relation cells and tuple identification cells. A tuple identification list is stored in the storing means. Only a single tuple identification cell is located adjacent each relation cell. The tuple identification cell includes a starting offset value and a run length value corresponding to positions in the tuple identification list.

According to another aspect of the present invention, a method is provided for improving retrieval of data based on a query from a user from a database management system including a main computer, means coupled to the main computer for storing record based data, a parallel computer coupled to the main computer, and a parallel disk array coupled to the parallel computer. The method includes the step of storing a value based index of selected data attributes related to the data in the parallel disk array. The value based index includes value cells and related data cells stored adjacent each value cell. The method also includes the steps of mapping the location of a boundary condition for each value cell and the related cells for each value cell stored in the parallel disk array, selecting a boundary condition corresponding to a selected value cell of the query, and distributing data stored in the parallel disk array within the selected boundary condition to the parallel computer. The method further includes the steps of recognizing and marking a span of data cells related to the selected value cell corresponding to the query on the parallel computer, and selecting a data cell corresponding to the query from said span of data cells related to the selected value cell to produce at least a partial result to the query.

According to yet another aspect of the present invention, a method is provided for improving retrieval of data based on a query from a user from a database management system including a main computer, means coupled to the main computer for storing the data, a parallel computer coupled to the main computer, and a parallel disk array coupled to the parallel computer. The method includes the steps of storing record based data on the storing means of the database management system, storing a value based index of selected data attributes related to the record based data on the parallel disk array, determining whether the parallel computer can be used to execute the query, and sending the query to the database management system and executing the query on the database management system to produce a final result upon determining that the parallel computer cannot be used to execute the query. The method also includes the steps of sending the query to the parallel computer upon determining that the parallel computer can be used to execute the query, determining whether a final result to the query can be determined from the parallel computer, executing the query on the parallel computer, and sending a final result from the parallel computer to the user upon determining that the parallel computer can be used to determine the final result. The method further includes the steps of sending a partial result to the database management system upon determining that the parallel computer cannot be used to determine the final result, obtaining the final result on the database management system using the partial result received from the parallel computer, and sending the final result from the database management system to the user.

According to still another aspect of the present invention, a system for improving retrieval of data from a database based on a query from a user. The system includes a parallel computer including a plurality of processors electrically coupled to each other in parallel, and means for storing data organized in a value based data structure including value cells and related data cells stored adjacent each value cell. The storing means is coupled to the parallel computer. The system also includes means for mapping the location of a boundary condition including a particular value cell and all data cells related to the particular value cell for each value cell stored in the storing means, means for distributing data within the boundary condition corresponding to a selected value cell of the query across the parallel computer so that each data cell in the boundary condition is read into a separate processor of the parallel computer, and means for executing the query on the parallel computer to obtain at least a partial result to the query from the parallel computer using the value based data stored in the storing means.

In an illustrated embodiment, the executing means includes means for recognizing and marking a span of data cells which are related to the selected value cell on the parallel computer, and means for selecting a data cell corresponding to the query from said span of data cells related to the selected value cell to produce at least a partial result to the query.

Also in an illustrated embodiment, the related data cells include relation cells and tuple identification cells. The value based data structure is stored in the storing means by association with related data cells without the use of explicit pointers to permit unbounded fanout of the value based data structure.

Additional objects, features, and advantages of the invention will become apparent to those skilled in the art upon consideration of the following detailed description of a preferred embodiment exemplifying the best mode of carrying out the inventions presently perceived.

BRIEF DESCRIPTION OF THE DRAWINGS

FIG. 7 is Table 1 used to illustrate a JOIN operation executed on the parallel computer of the present invention.

FIG. 8 is Table 2 used in the JOIN operation illustration.

FIGS. 9–15 are diagrammatical illustrations of a VAL-TREE data structure as read off the parallel disk array and into the parallel computer. FIGS. 9–15 illustrate each of the sequential steps performed during the JOIN operation.

FIG. 16 is a crossproduct JOIN table computed from the TIDs marked in FIG. 15.

FIG. 17 is a resultant JOIN table formed by the JOIN operation of Tables 1 and 2 illustrated in FIGS. 7 and 8, respectively, driven by the crossproduct table of FIG. 16.

DETAILED DESCRIPTION OF THE DRAWINGS

Figure 1:
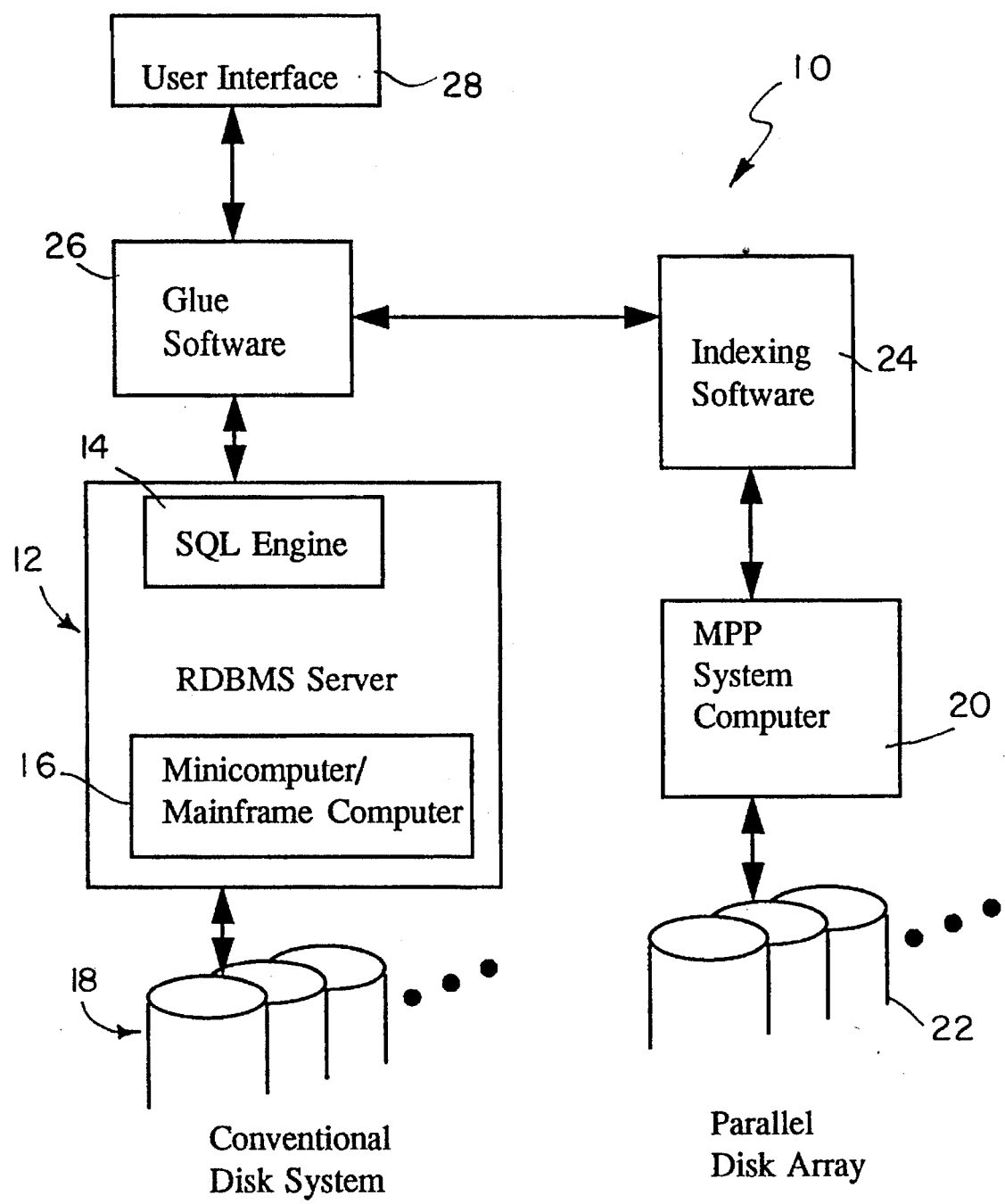
FIG. 1 is a diagrammatical illustration of a Relational Database Management System (RDBMS) of the present invention including a parallel computer coupled to a main computer of the RDBMS for storing a value based index of the data stored in a main memory and secondary storage (disk and tape) coupled to the main computer.

Referring now to the drawings, FIG. 1 illustrates the database and indexing system 10 of the present invention. A conventional Relational Database Management System (RDBMS) server 12 is provided. Illustratively, server 12 may be an Alpha AXP available from Digital Equipment Corporation. Server 12 includes a software component which is a Standard Query Language (SQL) Engine 14. SQL engine 14 runs on top of an operating system and connects low level data tables to end users and to various RDBMS tool kits. The physical computer 16 is a minicomputer or mainframe computer. Computer 16 and SQL engine 14 are jointly referred to as RDBMS server 12. Computer 16 includes a memory, a CPU, buses, and I/O capabilities. Preferably, server 12 has fast I/O channels coupled to a large disk array or disk farm 18. Elements 12–18 are components normally associated with traditional RDBMS. Data is stored on disk system 18 in a record based format with serial input and output.

The present invention adds four new components to the traditional RDBMS core system. A parallel computer 20 is coupled to server 12. Illustratively, parallel computer 20 may be a MP-1216 available from MasPar Computer Corporation. Parallel computer 20 must be a parallel processor computer to support the functionality of the present invention. Preferably, computer 20 is a massively parallel processor (MPP) having more than 1000 processors. Parallel computer 20 contains the same components as a standard computer system, including memory, CPUs, buses and I/O capabilities. Parallel computer 20 is coupled to a parallel disk array 22. Advantageously, parallel computer 20 can take advantage of an increased I/O bandwidth associated with parallel computers and parallel disk arrays. The relative size of parallel disk array 22 is smaller than the conventional disk system 18 since, in the present invention, only indexes must be stored in the parallel disk array 22. It is understood, however, that all the data and not just indexes may be stored in parallel disk array 22, if desired.

The present invention also includes core indexing software 24 which runs on top of an operating system of parallel computer 20. Indexing software 24 functions in a manner similar to the SQL engine 14 of server 12. Indexing software 24 takes requests from glue software 26 and produces an execution plan for parallel computer 20 to follow. Results produced from parallel computer 20 are then returned to the glue software 26 or can be returned directly to a user. A user interface 28 communicates with the software 26 to process queries as discussed in detail below.

It is desirable to provide indexes to facilitate retrieval of data from database 18 in order to eliminate the need to scan the entire database to find desired information. Text scanning is relatively slow, especially for large databases.

Figure 2:
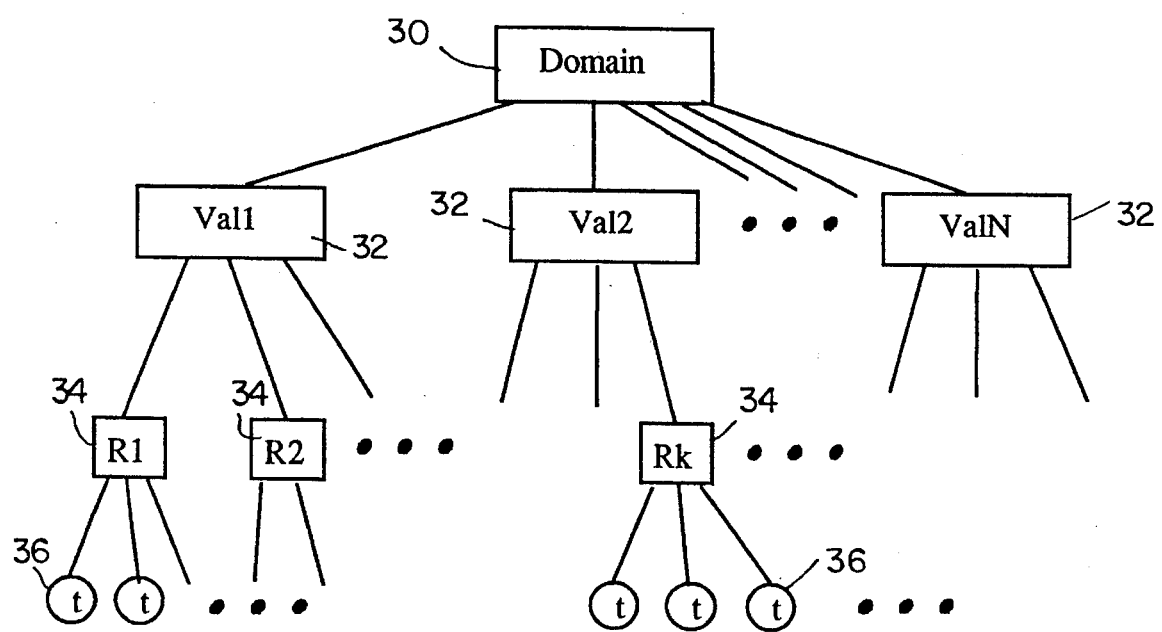
FIG. 2 is a block diagram illustrating a conceptual model of the value based data structure used in the present invention.

Indexes are stored data which provide a map for accessing the record based data stored in conventional disk system 18. In conventional RDBMSs, indexes are stored as another file which is serially computed and sorted like any other file. Data is stored in conventional disk system 18 in a record based storage structure with serial input and output. The present invention uses a value based storage structure to organize an index of the record based data stored on conventional disk system 18. Therefore the indexes of the database are stored in parallel disk array 22 in a value based structure. FIG. 2 illustrates a conceptual domain tree or value tree data structure used for storing indexes of the present invention.

The basic idea behind the value based data structure illustrated in FIG. 2 is that the data is organized and stored based on its value rather than the traditional approach for RDBMS which organizes and stores data based on associated units called records or rows in the RDBMS table. The first division of data in the value based system illustrated in FIG. 2 is the domain level cell illustrated by block 30. All values under a given domain cell 30 should have, at minimum, the same type (integer, float, string, etc.). Separate value cells 32 connected to domain cell 30 are provided for each and every distinct value that appears in domain 30. This feature requires unbounded fanout from each domain cell 30. Under each value cell 32, relation cells 34 are connected to value cell 32 for each and every distinct relation that contains the parent value cell 32. Again, this feature requires unbounded fanout. Within each given relation cell 34, a value may appear in one or many rows of the relation. Therefore, under each relation cell 34, a single tuple identifier cell 36 is provided for each and every distinct row from the relation that contains the grandparent value. Again, unbounded fanout is required. In other words, there must be a unlimited supply of those variables. As soon as a limit is placed on the number of the variables, this system will not work. Therefore, the value tree data structure illustrated in FIG. 2 cannot be efficiently implemented on a conventional serial machine.

The present invention does not use address based explicit pointers. The present invention uses associations between each of the various cells to arrange the data in the indexing system. The present invention uses parallel computer 20 to store related data physically beside each other in a group to provide an apparatus for implementing the conceptual data structure illustrated in FIG. 2.

Figure 3:
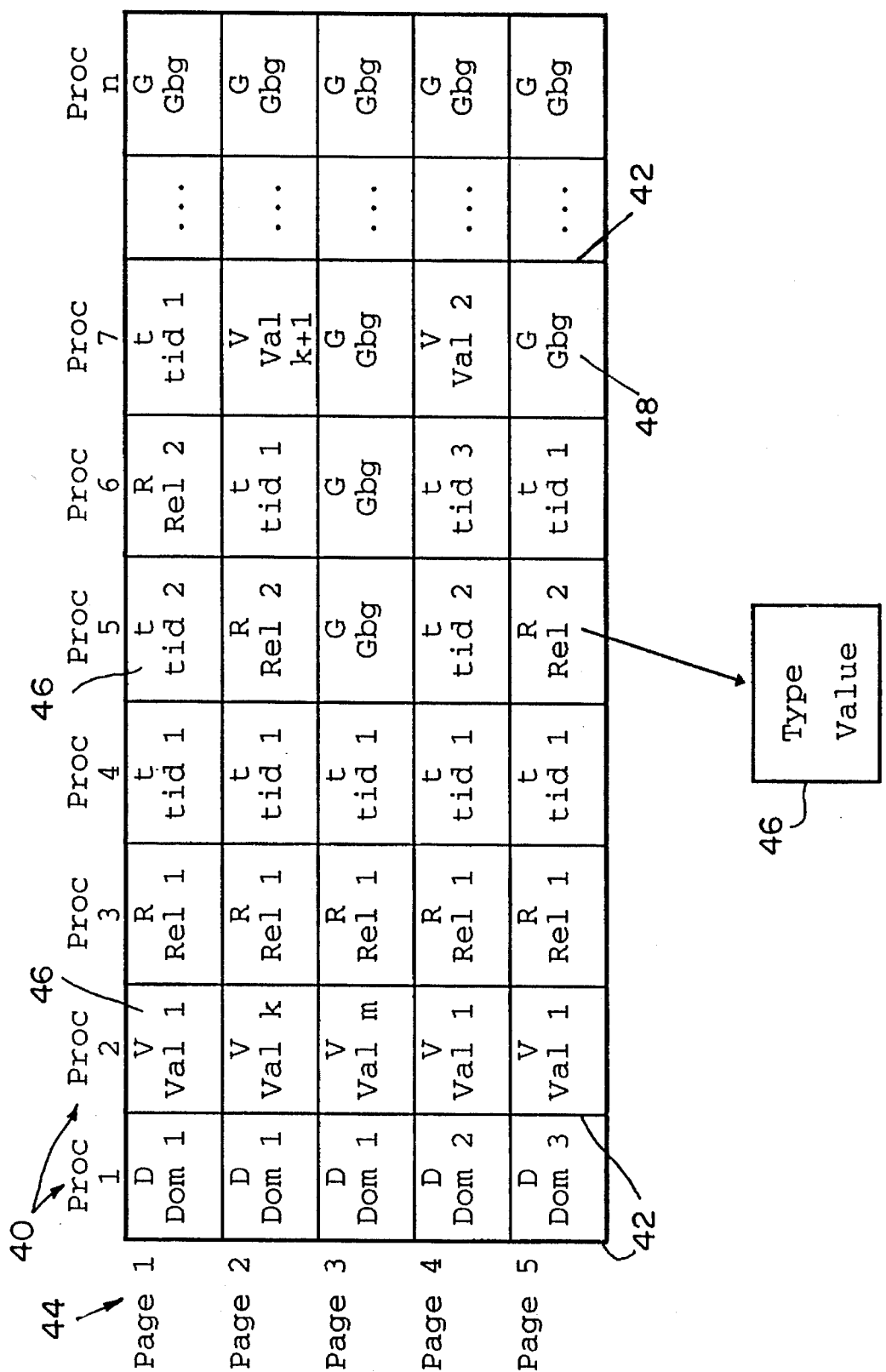
FIG. 3 is a diagrammatical illustration of the value based data structure implemented on the parallel computer of the present invention.

The value tree data structure as implemented on parallel computer 20 is illustrated in FIG. 3. A plurality of processors 40 (Proc. 1 through Proc. n) are provided in parallel computer 20. Typically the number of processors 40 ranges from 1,024 to 16,384 depending upon the particular computer selected. Vertical lines 42 represent partitions between individual processors 40. Within the memory space of each individual processor 40, several pages 44 of data are stored.

The number of pages 44 in memory at any given time is dependent on the size of the individual memory units of processors 40 and the work load on the system.

At start up time, in order to handle very large databases these pages are stored on the parallel disk array 22. Different segments of the stored data can be read into and out of the memory of computer 20 during an execution cycle of the query. A map of the data stored in parallel disk array 22 is provided so that any desired data can be read into the memory of parallel computer 20. Within each given cell 46 defined as a single element from a page on a single processor, a type field and value field are stored as illustrated by example block 47. The type field represents the depth of that cell in the value tree data structure (either a domain cell, value cell, relation cell or tuple identifier cell). The value field is the data value for that particular cell. Garbage cells 47 are introduced to represent empty cells. The percentage of garbage cells 47 is automatically padded on the right end of each page 44 and can be adjusted based on the frequency of updates.

A sample database is represented in the global memory space of FIG. 3. Three domains cells are represented. The first domain (Dom 1) spans pages 1–3. The second domain (Dom 2) spans page 4. The third domain (Dom 3) spans page 5. Processor 1 on every page contains the domain name for that page across all the processors 40. In no case does more than one domain cell occupy cells on a given page. If a domain ends without filling an entire page, the rest of the page is padded with garbage cells 48 (see, for example, page 3, processor 5 through processor n). This provides room for fanout of the value cells relation cells, and tuple identification cells within each domain.

When additional data must be added to the index stored in disk array 22, data in processor memory is shifted to the right to use the garbage cells 48 and make room for the new data entry. Because processors 40 work in parallel, updates can be performed in a constant small number of clock cycles.

The data representation illustrated in FIG. 3 contains no explicit pointers. Pointers to children nodes or cells in the graph illustrated in FIG. 2 are implemented associatively. In other words, all cells to the right of any given cell are associated with that cell until a cell with equal or higher height in the value tree is encountered. For example, in page 2, processor 2, there is a value cell for value k. Processor 3 through Processor 6 contain relation and tuple identifier cells, both lower in height than value cells, which are associated with the value k from processor 2. Page 2, processor 7 contains a new value cell for value k+1. Therefore begins a new span of information cells associated with value k+1.

There is no limit to fanout in this implementation. Garbage cells are normally placed at the right ends of each page to allow for inserts into the data structure. Garbage cells can be eliminated if any given value or relation span must cross page boundaries. By replacing garbage cells with additional data during an update cycle, the present invention permits unbounded fanout.

Figure 4:
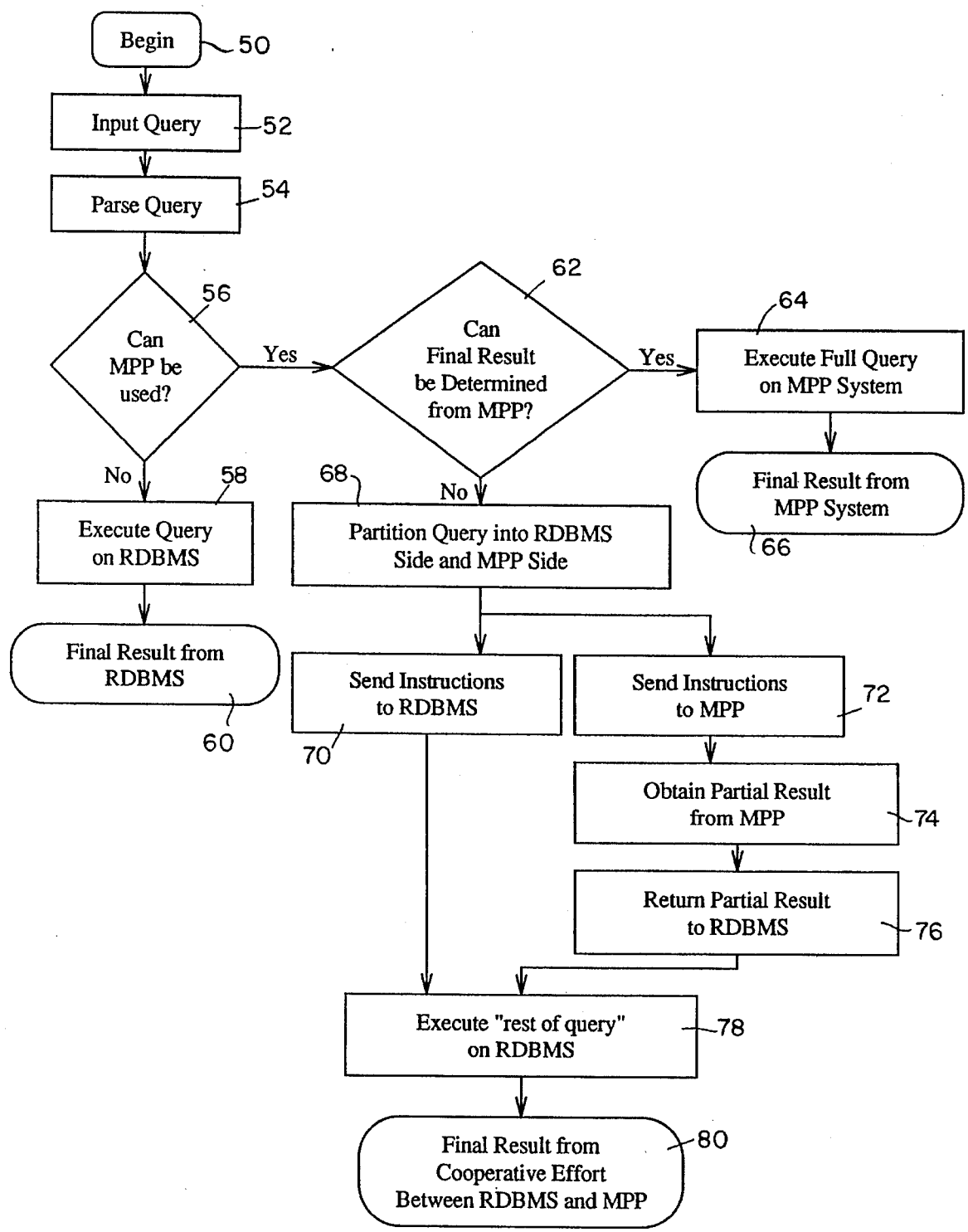
FIG. 4 is a flow chart illustrating the steps performed by the main computer to process a query and produce a final result from the RDBMS using the main computer memory, the parallel computer, or a combination of both.

FIG. 4 is an expansion of block 26 in FIG. 1 to illustrate the steps performed by the main computer 16 and parallel computer 20 during execution of a query. A query begins at block 50 and a user inputs a query at block 52. The input query is presented to a parser at block 54, either directly from a user or through a database tool kit or application program. The query is parsed and a corresponding parse tree is built. Computer 16 determines at block 56 whether the parallel computer 20 can be used to process the particular query. If parallel computer 20 cannot be used, computer 16 executes the query on the traditional RDBMS at block 58 using only main computer 16 and disk system 18 to obtain a final result of the query as illustrated at block 60.

If computer 16 determines that parallel computer 20 can be used to determine the final result of the particular query at block 56, computer 16 then determines whether the final result can be determined totally from parallel computer 20 at block 62. If the final result can be determined totally from parallel computer 20, the full query is executed on parallel computer 20 as illustrated at block 64. The final result is generated from parallel computer 20 at block 66.

In another embodiment of the invention, the entire database and not just indexes is stored in parallel disk array 22. In this embodiment, the full query is automatically executed on parallel computer 20.

If computer 16 determines that the final result cannot be determined totally from parallel computer 20 at block 62, the query is partitioned into a first set of instructions for execution on the RDBMS side and a second set of instruction for execution on the parallel computer 20 side as illustrated at block 68. Separate instructions are sent to RDBMS server 12 and to parallel computer 20 in parallel at blocks 70 and 72. A partial result is obtained from the instructions sent to parallel computer 20 as illustrated at block 74. The partial result is then returned to RDBMS server 12 as illustrated at block 76. Server 12 then uses the instructions received at block 70 and the partial result received from block 76 to execute the remainder of the query as illustrated at block 78. The final result from the cooperative effort between server 12 and parallel computer 20 is generated at block 80.

RDBMS typically include a Data Dictionary which provides a full description of the fields in a database. The Data Dictionary typically lists fields by name, number, or both, and often contains report-heading tags, field length, data type, high and low limits, format, etc. The Data Dictionary may also show relationships among record types. The Data Dictionary in the present invention is extended to include information about which objects have been indexed in parallel computer 20 and memory 22. As discussed below, the Data Dictionary is accessed in order to determine whether a query or portion of a query can be accessed on parallel computer 20.

Figure 5:
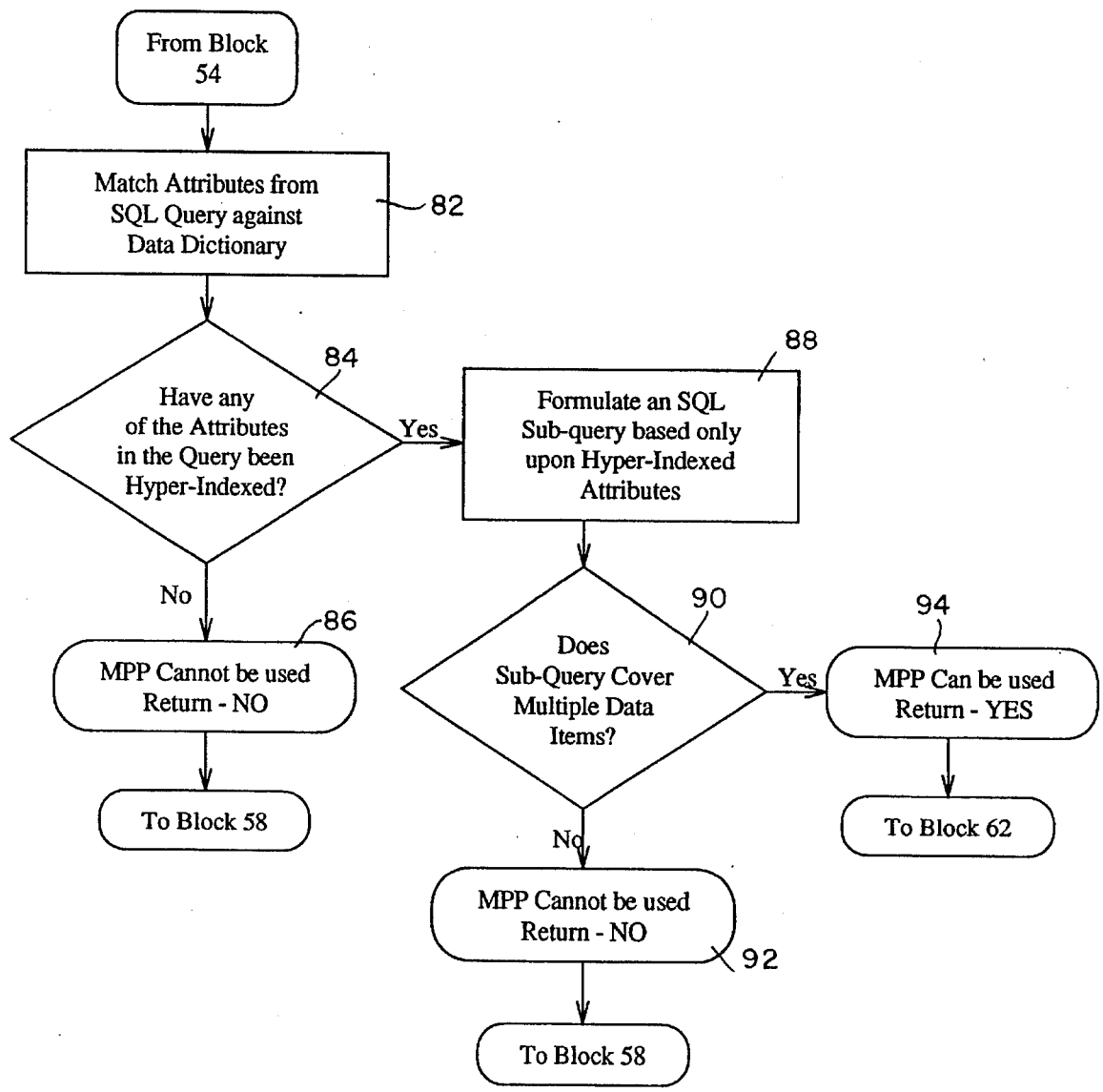
FIG. 5 is a flow chart further illustrating the steps executed by the main computer to determine whether the parallel computer is to be used to process a query.

FIG. 5 illustrates the further details of the steps performed by computer 16 to determine whether parallel computer 20 can be used to process a particular query. In other words, FIG. 5 is an expansion of block 56 in FIG. 4.

As illustrated in FIG. 5, attributes from the SQL query generated at block 54 are compared to the indexed attributes in the Data Dictionary at block 82. Computer 16 determines whether any of the attributes in the query have been indexed at block 84 based on the comparison with the information in the Data Dictionary. If none of the attributes from the query have been indexed, computer 16 determines that the parallel computer 20 cannot be used at block 86 and proceeds to block 58 in FIG. 4.

If computer 16 determines that attributes of the query have been indexed at block 84, computer 16 formulates an SQL sub-query based only on the indexed attributes at block 88. Computer 16 then determines whether using parallel computer 20 would accelerate the sub-query generated at block 88 as illustrated at block 90. In block 90, computer 16 determines whether the sub-query covers multiple data items. If only one data item is covered, then the use of parallel computer 20 would not accelerate the sub-query generated at block 88. If multiple data items are covered, then the use of parallel computer 20 would accelerate the sub-query generated at block 88.

If the use of parallel computer 20 would not accelerate the sub-query, computer 16 determines that parallel computer 20 should not be used at block 92 and proceeds to block 58 in FIG. 4. If the use of parallel computer 20 would accelerate the sub-query at block 90, computer 16 determines that parallel computer 20 should be used to execute the query at block 94. Therefore, computer 16 proceeds to block 62 in FIG. 4.

Many standard database operations can be performed on parallel computer 20 using the indexed data stored in parallel disk array 22 including JOIN, SELECT, PROJECT, RESTRICT, and scalar aggregate functions. JOIN operations are especially fast on the system of the present invention since data is stored in value order and operated on in parallel.

A JOIN operation is a key operation in the relational database model. The JOIN operation is particularly slow on sequential computers and, in many cases, is the limiting factor in database utility. In addition, many current databases avoid JOIN operation as much as possible by not decomposing or normalizing data to its highest form. Such short cuts introduce data integrity problems, increase costs, provide wasted disk space, and cause a loss of many of the mathematical properties that the relational database model was built upon.

The present invention keeps a map of boundary conditions on each page. For a known value, the boundary condition map shows the page on which the value is stored in parallel disk array 22. Therefore, the desired pages can be called up from parallel disk array 22 and distributed across the processors 40 of parallel computer 20. Parallel computer 20 and parallel disk array 22 therefore provide means for mapping the location of a boundary condition for each value stored in parallel disk array 22. Parallel computer 20 also provides means for distributing data stored in a boundary condition corresponding to a selected value cell of the query across the PEs of parallel computer 20. As discussed below in detail with reference to the JOIN operation, parallel computer 20 further provides means for recognizing and marking a span of data cells distributed across the PEs of parallel computer 20 related to the selected value cell of the query, and means for selecting a data cell corresponding to the query from said span of data cells related to the value cell of the query.

A JOIN operation is a multi-pass operation. A JOIN operation typically involves two different relations. The JOIN operation concatenates a tuple of one relation with the tuple of another relation if the values of the specified attributes in this pair of tuples satisfies some previously specified condition.

Typically, a first relation value (Rel 1) is not stored anywhere near a second relation value (Rel 2). During a JOIN operation, the system determines matches of value cells. However, in the present invention, value cells are stored only once, then all relation information such as Relation cells and Tuple Identification cells (TIDs) are stored next to the value cell by association. Therefore, the present invention does not have to reorder any data during the JOIN operation.

Figure 6:
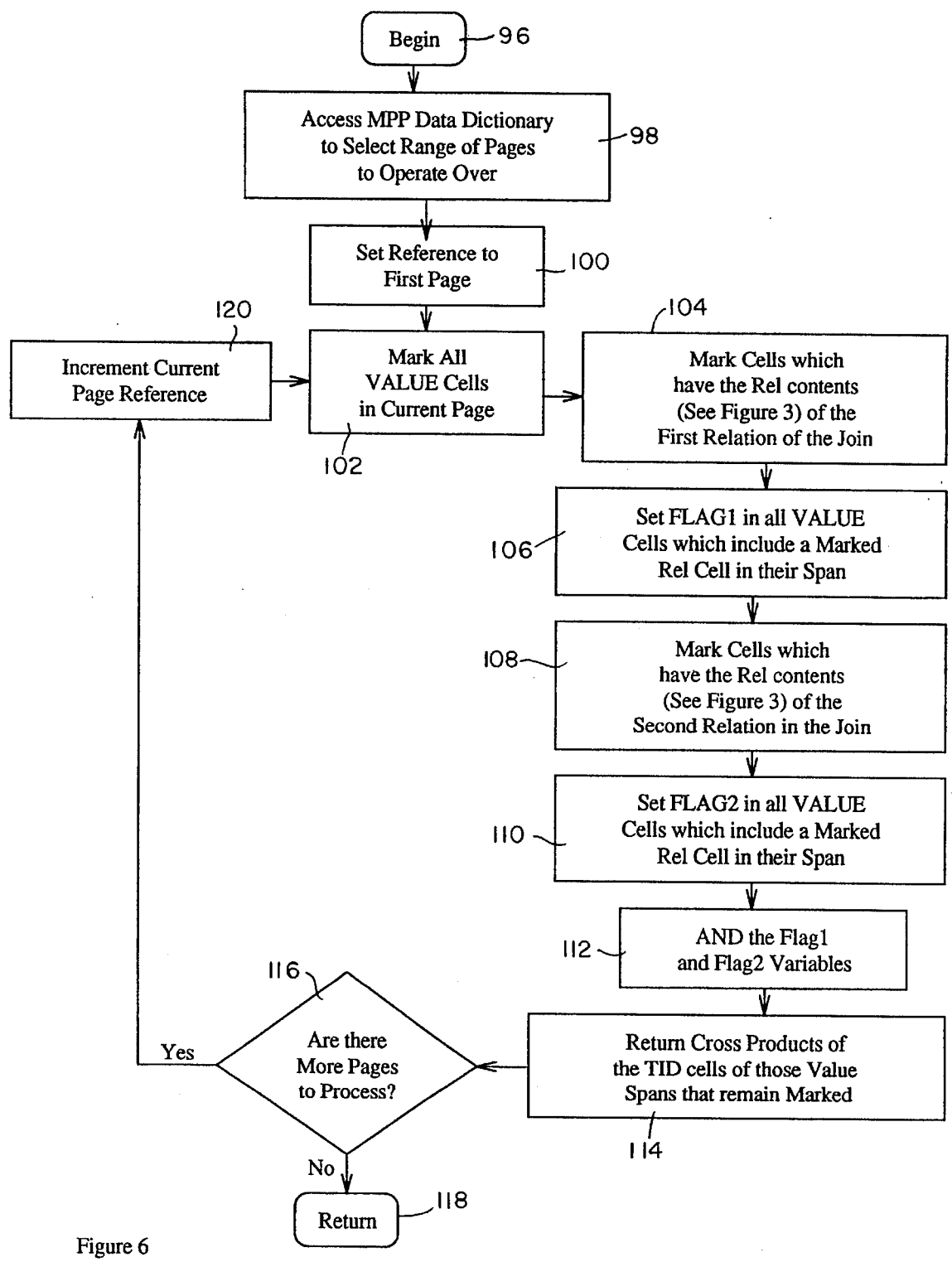
FIG. 6 is a flow chart of the steps performed by the RDBMS of the present invention to perform a JOIN operation.

FIG. 6 illustrates the steps performed by the apparatus of the present invention during execution of JOIN operation. The JOIN operation beings at block 96. The Data Dictionary for the parallel computer 20 is accessed at block 98 to determine and select a range of pages over which the JOIN operation operates. The first reference page is set at block 100. All value cells in the current page are marked at block 102. Cells are then marked which have the relation contents of the first relation (REL 1) in the JOIN operation at block 104. Flag 1 in all value cells which include a marked relation cell is set at block 106. Cells are then marked which have the relation contents of the second relation (REL 2) in the JOIN operation at block 108. Flag 2 in all value cells which include a marked relation cell in their span is set at block 110. An AND operation is performed on the Flag 1 and Flag 2 variables at block 112. Cross products of the tuple identification cells of those value spans that remain marked are returned at block 114. Parallel computer 20 then determines whether there are more pages to process at block 116. If there are no more pages to process, returns at block 118. If computer 20 determines there are more pages to process at block 116, the current page reference is incremented at block 120. The computer then proceeds at block 102 to mark value cells in the new current page at block 102. This completes the loop of the JOIN operation.

In order to clarify the JOIN operation, an example will be discussed. A JOIN is an operation in which two relational tables in a database system are programmatically combined to form a third table. JOINing involves selecting rows (tuples) from each table and combining them to form new tuples that contains all the information originally in the two distinct tuples. Selection of the tuples to be JOINed is performed about "pivot points". The pivot points are specified as a specific column in each table. Equivalent values (cells) anywhere along both columns cause the corresponding rows in each table to be combined into a third row. The process is repeated until all permutations are covered and the resulting combined rows form a new, third, table.

The apparatus and method of the present invention advantageously permits extremely rapid JOIN operations to be performed when the data contained in the pivot points has been previously organized into Domains by a Data Base Administrator (DBA).

In the illustrated example, two tables will be JOINed. Table 1 (RDAT) illustrated in FIG. 7 contains information about runways available in the State of Indiana (Table 1 is not an exhaustive list). The information in Table 1 includes runway numbers (Rno), length (Rlen), type (Rtype) and the name of a city close to the runway (Rapt).

Table 2 (ES) illustrated in FIG. 8 contains a list of emergency services available at certain locations in Indiana. This information includes such information as service type available (Stype), number of gallons (Sgal) of the service, and the city (Sloc) providing the service. The service type is coded numerically. Number 1 stands for a first type of foam. Number 2 stands for a second type of foam. Number 3 stands for water.

In this example, a corporate flight department has decided that it needs a certain type and length of runway to ensure the safety of its operations. Furthermore, it has decided that it requires certain emergency facilities to be in close proximity to the intended airport of operation. Specifically, it requires at least 8,000 feet of runway and 20,000 gallons of foam. To determine suitable locations and runways, it is first necessary to JOIN the RDAT and ES tables (see tables 1 and 2) pivoting on the Rapt column in RDAT of FIG. 7 and the Sloc column in ES of FIG. 8.

A typical SQL query for this operation would be:
SELECT RDAT.*,ES.*s
FROM RDAT, ES
WHERE RDAT.Rapt=ES.Sloc;

The DBA for this database has determined that city names are likely to be involved in JOIN operations and has created a "city names" domain. The indexing procedure creates a VALTREE. The VALTREE is a core data structure used to facilitate database operations by the parallel computer hardware. Creation of the VALTREE is, nominally, a one-time event; however it must be updated when new information (in our example: new city names) are added. Because this example is extremely simple and uses only one indexed data type, it must be stressed that the VALTREE structure is completely general. The DBA is free to include any type of data in the VALTREE and multiple domains are fully supported. Furthermore, although this example concerns only JOIN operations, the VALTREE is also used to accelerate other types of database operations.

For each domain entry the VALTREE contains information in the REL entries which identifies tables in the relational database and the columns of those tables in which instances of the individual members of the domain reside. Furthermore the TID entries in the VALTREE point into the specific tuples in each table which contain the data. The information taken from the REL and TID entries give the exact locations of any given indexed entry. The REL and TID entries in the VALTREE are repeated for each element in the domain as necessary to include all tables, rows, and columns containing the data. The aggregate of the elements of the domain entry and all of the pointers to locations containing that entry are referred to as a VAL Span in the VALTREE.

Figure 9:
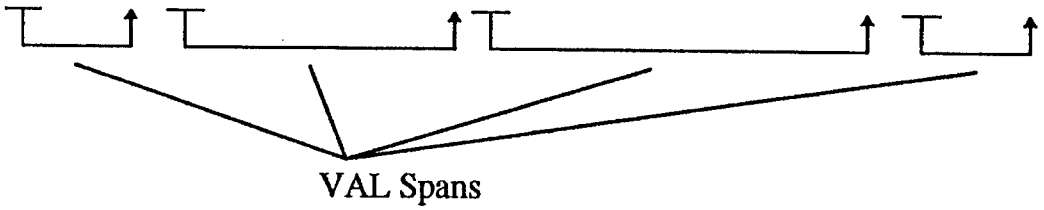

FIG. 9 illustrates the VALTREE data structure as read off of the parallel disk array 22 and into the PE (processing element) array of parallel computer 20. The individual elements of the VALTREE structure are sequentially assigned to PEs. Additionally, each PE reserves a portion of its memory for selection flags.

Although not depicted in this and subsequent figures, the very first PE contains data of type domain which identifies the domain to which all the VAL entries belong (city names domain in the present example). The VALTREE structure is stored on disk as a continuous data stream and the domain entries separate the various indexed domains in the stream. Because all PEs are processors capable of performing operations simultaneously and independently of each other, massive searches of data within the PE array are extremely fast.

Figure 10:
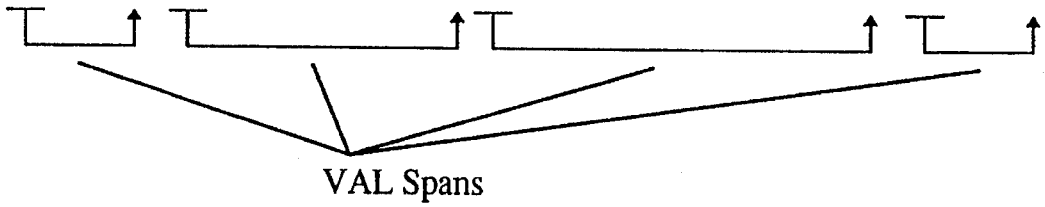

The next step of the JOIN operation is illustrated in FIG. 10. It is necessary to determine if any of our individual domain entries (city names) reside in the RDAT table and, more specifically, in the Rapt column. To determine if this is the case, parallel computer 20 "asks" all PEs to mark themselves if they are of type "REL" and have contents "RDAT/Rapt." The PEs accomplish this marking by setting an internal flag (Flag 0) if they are associated with the desired data.

We are ultimately interested not only in the PEs of type REL, but rather in the entire VAL Span containing the selected PEs of type REL. So, for each PE with flag 0 set (see FIG. 10), parallel computer 20 identifies the head of its Val Span which will always be a PE of type VAL. That PE identifies itself as the head of a VAL Span that contains REL cells selected in the first sweep (flag 0 in FIG. 10) by setting an internal flag (flag 1) as illustrated in FIG. 11.

Figure 11:
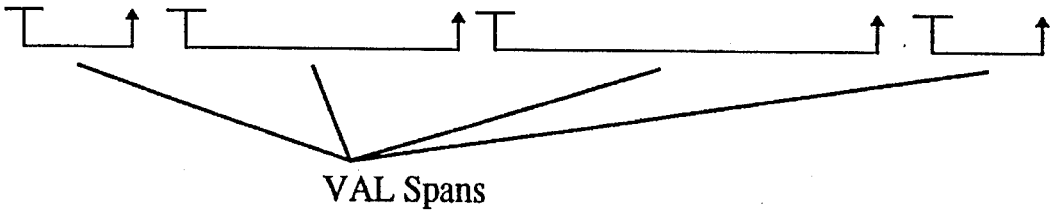
Figure 12:
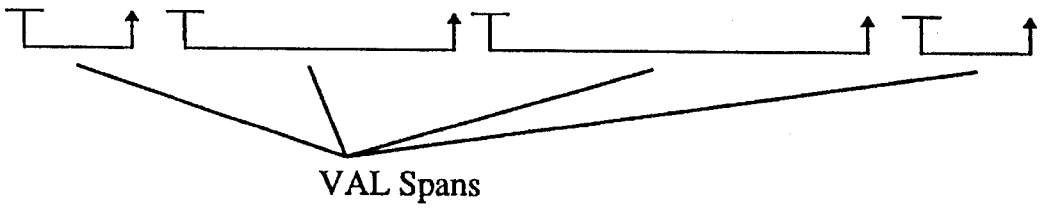

The processes depicted in FIGS. 10 and 11 are repeated in FIGS. 12 and 13. However, on this sweep REL cells pointing to the ES table and the Sloc column are detected and marked. The respective marker flags for this step is flag 2 as illustrated in FIG. 12. For each PE with flag 2 set, parallel computer 20 identifies the head of its VAL Span by setting flag 3 as illustrated in FIG. 13.

The identification operation illustrated is illustrated in FIG. 14. Parallel computer 20 then asks all PEs to examine themselves, and any PE of type VAL and with both flags 1 and 3 set constitutes the head of a VAL Span describing data contained in both the RDAT and ES tables and residing in the pivot points of Rapt and Sloc, respectively. Those PEs are then marked by setting a fifth flag, flag 4.

For each VAL Span, whose head is marked by flag 4, there will always be two PEs of type REL and with either flag 0 or 2 set. Those PEs return the values contained in the TID cells immediately adjacent to them as illustrated by dark, heavy lines 130 in FIG. 15.

Figure 15:
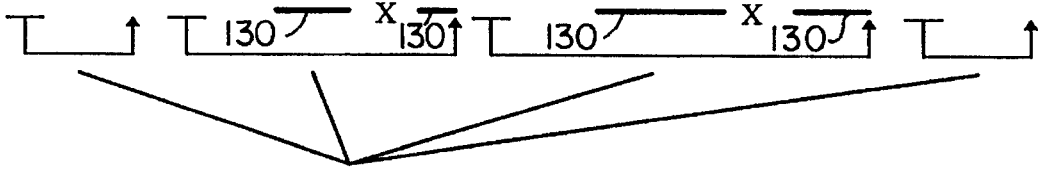

A crossproduct is performed using the values contained in the TID cells indicated by the dark, heavy lines 130 in FIG. 15. The JOIN crossproduct table illustrated in FIG. 16 is built from the crossproducts of the TIDs indicated in FIG. 15. This JOIN crossproduct table drives the JOIN operation of tables RDAT and ES. The JOIN operation yields a third JOIN table. The resultant JOIN table formed by the JOIN of Tables 1 and 2 as driven by the JOIN crossproduct table is illustrated in FIG. 17.

Figures 18, 19:
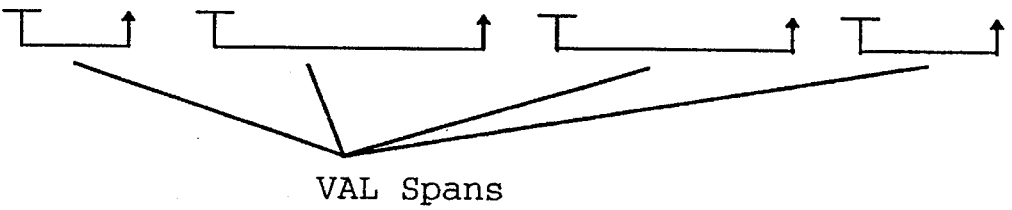
FIG. 18 is a second storage structure which can be used in accordance with the present invention in which there is only a single TID node or cell following a REL cell.
FIG. 19 is a TID list as it is stored in the parallel disk array for use with the FIG. 18 storage structure to build a crossproduct table.

The JOIN table of FIG. 17 may also be formed with an alternative storage structure illustrated in FIGS. 18 and 19. If one examines the original VALTREE structure as illustrated in FIGS. 9-16, it becomes apparent that the PE cells of type TID are unused until they are selected for the crossproduct at FIG. 15. These TID cells therefore represent wasted space in the processors of parallel computer 20 until they are involved in the final computation of the crossproduct table of FIG. 16.

A second VALTREE structure which can be used in accordance with the present invention is illustrated in FIG. 18. The second VALTREE structure is particularly advantageous when the value base data to be stored includes a high average number of TIDs per REL. The second structure differs from first VALTREE structure of FIGS. 9-15 only in that, for every REL cell, there is only one TID cell. In the original structure, each REL cell (which points to a specific table and column) was followed by as many TID cells as necessary to identify every row in the table which contained the subject data specified in the VAL cell at the head of the VAL Span.

In the revised structure, there is only one TID cell following a REL cell. Instead of containing a pointer to a single row in the table, the TID cell in FIG. 18 contains a pointer into a TID list file stored in parallel disk array 22. This pointer includes both a starting offset into the file and a run length. The run length is in the brackets "[ ]" of FIG. 18.

FIG. 19 illustrates the TID list file as it is stored in parallel disk array 22. As an example, the first TID pointer (from the left) in the VALTREE structure in FIG. 18 indicates an offset of zero and a run of 1. Referring to the table of FIG. 19, it is seen that the first TID pointer then contains only the TID "value" of 5. The second TID pointer has an offset of 1 and a run of 2, which maps to TID values of 3 and 4.

The third TID pointer has an offset of 3 and a run of 1. Therefore, the third TID pointer maps to a TID value of 3. The fourth TID pointer has an offset of 4 and a run of 3. Therefore, the fourth TID pointer maps to TID values of 1, 2 and 6. The fifth TID pointer has an offset of 7 and a run of 2. Therefore, the fifth TID pointer maps to TID values of 1 and 2. The sixth TID pointer has an offset of 9 and a run of 1. Therefore, the sixth TID pointer maps to a TID value of 4. These TID values are the same as the expanded TID values illustrated in FIGS. 9-15.

Flag 0 to flag 4 in the second VALTREE structure illustrated in FIG. 18 are marked in a manner identical to flags 0 to flag 4 as discussed above with reference to FIGS. 9-15. However, reference is made to the stored TID list of FIG. 19 when the crossproduct table of FIG. 16 is built using the VALTREE structure of FIG. 18.

Although the invention has been described in detail with reference to certain illustrated embodiments, variations and modifications exist within the scope and spirit of the invention as described and defined in the following claims.

What is claimed is:

1. A method for improving retrieval of data based on a query from a user from a database management system including a main computer, means coupled to the main computer for storing the data, a parallel computer coupled to the main computer, and a parallel disk array coupled to the parallel computer, the method comprising the steps of:

storing record based data on the storing means of the database management system;

storing a value based index data structures of selected attributes related to the record based data in the parallel disk array;

determining whether the parallel computer can be used to execute the query using only data stored in the index data structures in the parallel disk array;

sending the query to the database management system and executing the query on the database management system to produce a final result upon determining that the parallel computer cannot be used to execute the query;

sending the query to the parallel computer upon determining that the parallel computer can be used to execute the query using only data stored in the index data structures in the parallel disk array;

determining whether a final result to the query can be determined from the parallel computer using only data stored in the index data structures in the parallel disk array;

executing the query on the parallel computer;

sending a final result from the parallel computer to the user upon determining that the parallel computer can be used to determine the final result using only data stored in the index data structures in the parallel disk array;

sending a partial result to the database management system from the parallel computer upon determining that the parallel computer cannot be used to determine the final result using only data stored in the index data structures in the parallel disk array;

obtaining the final result on the database management system using the partial result received from the parallel computer; and sending the final result from the database management system to the user.

2. The method of claim 1, wherein the parallel computer is a massively parallel computer.

3. The method of claim 1, wherein the value based index of selected attributes includes value cells and related data cells stored adjacent each value cell and the step of storing the value based index stores the value cells and the related data cells by association with without the use of explicit pointers to permit unbounded fanout of the value based index.

4. The method of claim 3, wherein the step of executing the query on the parallel computer includes the steps of:

distributing data stored in a boundary condition corresponding to a selected value cell of the query across the parallel computer;

recognizing and marking a span of data cells related to the value cell of the query on the parallel computer; and selecting a data cell corresponding to the query from said span of data cells related to the value cell of the query.

* * * * *